United States Patent [19]

Murray et al.

[11] Patent Number: 4,587,043

[45] Date of Patent: May 6, 1986

[54] DECONTAMINATION OF METAL SURFACES IN NUCLEAR POWER REACTORS

[75] Inventors: Alexander P. Murray, Murrysville; Sharon L. Weisberg, Pittsburgh; Lawrence F. Becker, Jr., N. Huntingdon, all of Pa.

[73] Assignee: Westinghouse Electric Corp., Pittsburgh, Pa.

[21] Appl. No.: 501,980

[22] Filed: Jun. 7, 1983

[51] Int. Cl.⁴ .............. G21F 9/00; C23G 1/02
[52] U.S. Cl. .................. 252/626; 134/3; 134/27; 134/28; 252/146; 252/631; 376/310; 422/159; 422/903
[58] Field of Search .......... 252/626, 631, 82, 146, 252/142; 134/3, 2, 22.17, 22.19, 27, 26, 28, 29, 38, 41; 422/903, 159, 905; 376/309, 310

[56] References Cited

U.S. PATENT DOCUMENTS

| 3,080,262 | 3/1963 | Newman | 134/3 |
| 3,258,429 | 6/1966 | Weed | 252/626 |
| 3,496,017 | 2/1970 | Weed | 252/626 |
| 3,522,093 | 7/1970 | Woolman | 134/3 |
| 3,613,909 | 12/1961 | Pancer et al. | 252/626 |
| 3,615,817 | 10/1971 | Jordan | 252/626 |
| 3,664,870 | 5/1972 | Oberhofer et al. | 252/626 |
| 3,873,362 | 3/1975 | Mihram et al. | 252/626 |
| 4,287,002 | 9/1981 | Torok | 134/3 |

OTHER PUBLICATIONS

Hawley, G. 1981, The Condensed Chemical Dictionary–10th edition, Van Nostrand Reinhold Company, New York, p. 852.

Primary Examiner—Stephen J. Lechert, Jr.
Assistant Examiner—Howard J. Locker
Attorney, Agent, or Firm—R. D. Fuerle

[57] ABSTRACT

A method for decontaminating metal surfaces having radioactive oxide deposits thereon is disclosed which comprises preparing a decontamination solution having a pH of about 1.5 to about 4 comprising water, about 0.02 to about 0.5% of a water soluble organic acid which has an equilibrium constant in a complex with ferric ion of at least about $10^9$ and which is capable of producing a pH of about 2 to about 3 in water, and about 0.01 to about 0.4% of a chelate in free acid form which has an equilibrium constant in a complex with ferric ion of about $10^{15}$ to about $10^{19}$ and which is at least 0.4% soluble at 40° C. in water having a pH of about 2 to about 3. An apparatus for performing the above method is disclosed.

17 Claims, 1 Drawing Figure

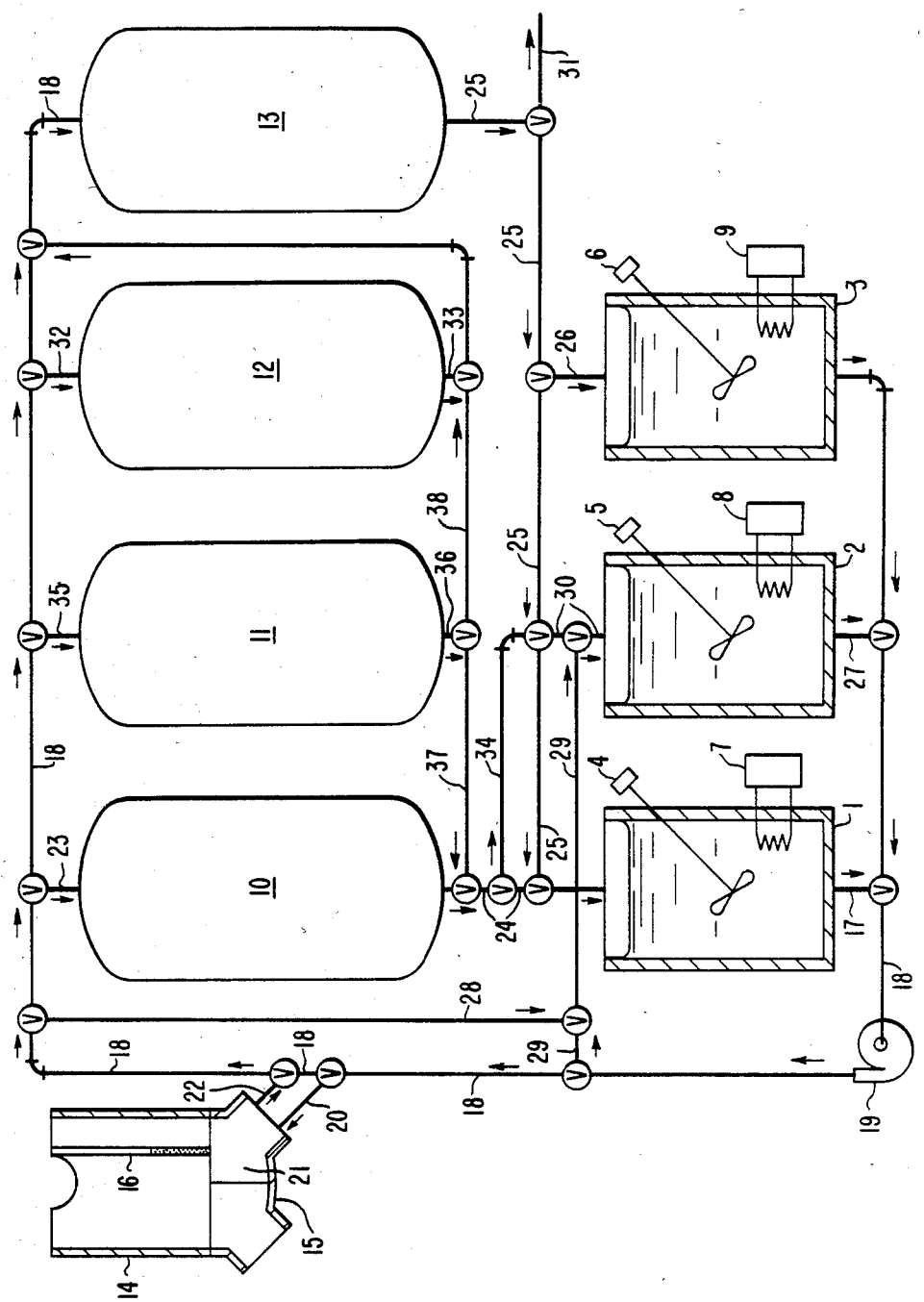

DECONTAMINATION OF METAL SURFACES IN NUCLEAR POWER REACTORS

CROSS-REFERENCE TO RELATED APPLICATIONS

This application is related to application Ser. No. 655,319, filed Sept. 27, 1984, by A. P. Murray, L. F. Becker, and M. C. Skriba, titled "Improved Ozone Oxidation of Deposits in Cooling Systems of Nuclear Reactors."

This application is related to application Ser. No. 513,567, filed July 14, 1983, by S. L. Weisberg, A. P. Murray, and L. F. Becker, titled "Iron Removal From EDTA Solutions."

BACKGROUND OF THE INVENTION

Water or various gases are used in many types of nuclear reactors to remove heat from the reactor core, which is then directly or indirectly used to generate electricity. In the pressurized water reactor (PWR), water circulates between the reactor core and a steam generator in a primary loop. In the steam generator, the heat is transferred to a secondary loop of water which forms steam which then runs turbine electric generators. In a boiling water reactor (BWR), the water in the primary loop is under less pressure so that it is in a gaseous form. In other types of nuclear reactors, such as high temperature gas reactors (HTGR), a gas such as carbon dioxide or helium transfers heat from the reactor core to the steam generator.

Regardless of whether the heat transfer medium is water or a gas, however, it picks up contaminants from the metals with which it is in contact, and the contaminants then deposit on metal surfaces in the cooling system. These contaminants include chromium which enters the coolant when base metals such as stainless steel or Inconel corrode. Chromium (+6) is soluble (e.g., as dichromate, $Cr_2O_7^=$) but chromium (+3) forms an oxide with a spinel structure, which is very difficult to remove from the metal surfaces. Such spinel-like oxides include chromium substituted nickel ferrites, such as $Cr_{0.2}Ni_{0.6}Fe_{2.2}O_4$, which tend to form under the reducing conditions found in pressurized water reactors. The deposits can also contain nickel ferrite, hematite, magnetite, and various radionuclides. Nickel ferrite, $NiFe_2O_4$, tends to form under the oxidizing conditions found in boiling water reactors, but it is easier to remove than chromium substituted ferrites. Radionuclides in the deposits can come from non-radioactive ions that enter the coolant and are made radioactive by neutron bombardment in the core. For example, cobalt from hard facing alloys, which are used in seals and valve facings, can go from non-radioactive cobalt 59 to highly hazardous and radioactive cobalt 60 when bombarded by neutrons. Also, stable nickel 58, from high nickel alloys (e.g., inconel), can be irradiated to radioactive cobalt 58.

These deposits can form on the inside surfaces (primary surfaces) of the primary loop of a pressurized water reactor, or in the steam generator core, or in the piping inbetween. The deposits could also form on the steam generating side (secondary surfaces) of the steam generator, but there the problem is much less severe because the radioactivity is lower and the deposits are more easily dissolved. In a boiling water reactor the deposits can form on turbine blades or in any part of the cooling loop. In a high temperature gas reactor, the deposits can form on the primary cooling loop. Generally, the deposits formed in pressurized water reactors are the most difficult to remove, so if a process and composition can remove those deposits, it can also remove deposits formed in other types of reactors.

While the deposits are usually too thin to plug any of the tubing, they represent a safety hazard to personnel because of their high radioactivity. Thus, in order to inspect the cooling system and perform maintenance on it, it is necessary to decontaminate it first so that the hazard to humans is reduced or eliminated. In addition to the radiation hazard the deposits present, they also prevent the formation of a good seal when tubing must be repaired. This is done by "sleeving," inserting a new, smaller tube into the old tube and swaging the tubes together. In a steam generator it is necessary to hone a tube with an abrasive to remove the oxide layer down to clean metal in order to obtain a good seal by swaging or brazing. Because this is a time consuming task, it increases the radiation exposure to the technician.

In spite of their thinness, (usually only about 2 to 5 microns), radioactive deposits in the cooling systems of nuclear reactors are very tenacious and difficult to remove. Many techniques have been tried to eliminate these deposits. Inhibitors have been added to the coolant system, but most inhibitors break down under the extreme conditions of temperature and radiation, and, in doing so, may form corrosive products. Continuous precipitation of the ions forming the deposits has been found to be ineffective. Many decontamination solutions which have been tried may themselves corrode the metals in the cooling system or may work too slowly to be economical. This is particularly true of concentrated reagents, which may require shutting down the power plant for several months. Speed in decontaminating is important because a generator which is shut down can cost a utility a million dollars a day in lost electricity.

SUMMARY OF THE INVENTION

We have discovered compositions, processes, and apparatus for decontaminating the cooling systems of nuclear power reactors by removing deposits on the metal surfaces in the cooling systems. Our invention results in a very high decontamination factor (DF) of typically 15 to 20. (The decontamination factor is the activity in curies before decontamination divided by the activity in curies after decontamination.) The process of our invention can be performed on the steam generator of a pressurized water reactor in less than 24 hours, plus set-up time, which greatly reduces the cost of down time to the utility. The compositions used in this invention are all ion exchangeable, which means that contaminants can be removed on an ion exchange column and many of the reagents can be recovered and reused. The process uses less reagent than other processes and most of the reagents are very inexpensive. Virtually all of the radioactive contaminants are captured by the ion exchange columns, and there is a very low residual solution activity. As a result, there is a low waste volume, and the waste water from the process has less than $5 \times 10^{-4}$ micro Ci/ml cobalt 60 activity, which is considered exempt from government control by the Nuclear Regulatory Commission. We have also found that the preferred process of this invention can clean a system so thoroughly that it is not necessary to hone the tubes of a steam generator before they are sleeved with new tubes, attaining decontamination factors better than 50. The process is non-corrosive to the metals and alloys in a nuclear reactor cooling system.

We have also found that about a 50% increase in DF is obtained if decontamination is done before oxidation, followed by a second decontamination. This is unexpected because the initial decontamination does not increase the step DF very significantly (<5% activity change). Decontaminating first also enables the operator to check out the system, since the decontamination solution is transparent while the oxidation solution is opaque. Moreover, adding an additional oxidation and decontamination step results in clean metal that can be sleeved.

Finally, we have found that an excess of permanganate in the oxidizing solution produces superior decontamination when the concentration of the oxidizing solution is less than 3%.

DESCRIPTION OF THE INVENTION

The accompanying drawing is a diagram which illustrates a certain presently preferred embodiment of the apparatus and process of this invention.

In the drawing, three tanks numbered 1, 2, and 3, each provided with a stirrer 4, 5, and 6, and a heater 7, 8, and 9, contain a dilute decontamination solution, a dilute oxidizing solution, and deionized water, respectively. In addition, ion exchange columns 10, 11, 12, and 13 contain a cation exchange resin, an anion exchange resin, and two mixed anion-cation exchange resins, respectively. All of the ion exchange resins must be strong resins, except the anion resin (in 11) where a higher capacity weak base resin is preferred to reduce resin volume and subsequent waste disposal cost. Finally, there is illustrated a steam generator 14 which is to be decontaminated. The coolant in the steam generator has been drained and stored. The steam generator has a divided channel head 15 and several thousand heat exchange tubes 16, only one of which is illustrated in the drawing. The process of this invention involves passing the decontamination solution, the oxidizing solution, and the water rinse through the steam generator and the ion exchange resins. Whether the passage of a particular solution through the steam generator is repeated depends upon how thoroughly one desires to remove the deposits from the tubes in the steam generator. In the simplest process, the steam generator is decontaminated, then oxidized, and then decontaminated again. If clean metal is desired for sleeving, an additional oxidation and decontamination step are required.

In the presently preferred process, the various valves shown in the drawing are turned so that the decontamination fluid in tank 1 flows through lines 17, 18, pump 19, lines 18 and 20 into the hot leg side 21 of the channel head 15 of steam generator 14. It is desirable to force the decontamination solution only about 4 feet up into tubes 16, as that is usually where the worst deposits build up. The decontamination fluid is preferably put through a bumping cycle which forces it up and down tubes 16 about three or four times each hour. The fluid then passes through lines 22, 18, and 23 into cation exchange column 10 where the metal ions are removed. The decontamination solution then flows through line 24 back to tank 1. Recirculation of the decontamination solution continues until the level of radioactivity in line 22 is not significantly higher than that in line 20.

When the decontamination cycle is finished, the decontamination fluid is drained to tank 1, and the generator is rinsed. This is accomplished by changing the valves shown in the drawing so that water from tank 3 flows through lines 18 and 20 into steam generator 14 and up into the tubes at least as high as the decontamination fluid flowed. The rinse then flows through lines 22 and 18 into mixed ion exchange column 13, where any ions that are present are removed. The resulting clean water then passes through lines 25 and 26 back into tank 3. The rinse cycle is continued until an analysis of the contents of line 22 show that no further significant quantities of ions are being removed from the steam generator. The rinse water is preferably bumped into tubes 16 in the same way that the decontamination solution was.

In the next step, the valves shown in the drawing are turned so that the oxidizing fluid in tank 2 passes through lines 27, 18, and 20 into the tubes of steam generator 14 where it is bumped as the previous liquids were. The oxidizing solution then passes through lines 22, 18, 28, 29, and 30 into tank 2. The cycle is continued until the chromium (as dichromate) level in line 22 is not significantly greater than the chromium level in line 20. When the oxidation cycle is complete, the rinse, decontamination, and rinse cycles are repeated as described hereinabove. To remove deposits down to clean metal, the oxidation, rinse, and decontamination cycles are repeated.

After a final rinse of the steam generator, it is necessary to clean the tanks and the rest of the decontamination system. This process is begun by setting the valves shown in the drawing so that the water in the rinse tank 3 flows through line 18 to mixed ion exchange column 13, which removes both anions and cations from the rinse water. The water leaves mixed ion exchange column 13 through lines 25 and 31 to a drain.

In the next step of the clean up procedure, the valves are set so that the oxidizing solution in tank 2 flows through lines 27, 18, and 32 to mixed ion exchange column 12 which removes all of the reagents in it and the metal ions. The water then passes through lines 33 and 18 to mixed ion exchange column 13 to remove any remaining metal ions or reagents. The clean water passes through lines 25 and 31 to the drain.

In the third step, the valves are changed so that the decontamination fluid in tank 1 passes through lines 17, 18, 29, and 30 into tank 2. The valves are then changed so that the decontamination fluid is circulated from tank 2 through lines 27, 18, and 23 to cation ion exchange column 10 which removes the metal ions. The fluid then passes through lines 24, 34, and 30 back to tank 2. Recycling is continued until tank 2 is clean and the metal ions have been removed from the solution. The valves are then changed so that the decontamination fluid flows from tank 2 through lines 27, 18, and 35 back to anion ion exchange column 11, which removes the decontamination reagents. The fluid then passes through lines 36, 37, and 24 to tank 1.

In the next step of the clean up procedure, the fluid in tank 1 is passed through lines 17, 18, and 35 to anion ion exchange column 11 which removes any remaining decontamination reagent. The fluid then passes through lines 36, 38, 33, and 18 to mixed ion exchange column 13 which removes both cations and anions. The fluid then goes through lines 25 and 24 back to tank 1. When the fluid has been cleaned adequately the valves are changed so that the fluid in tank 1 passes through lines 17, 18, 29, and 30 to tank 2. In order to complete the rinse of the oxidizing tank 2, the fluid is then recycled through lines 27, 18, and 35 into anion ion exchange column 11, then through lines 36, 38, 33, and 18 to mixed ion exchange column 13, then back through lines 25 and 30 into tank 2. When tank 2 has been adequately rinsed, the valves are changed so that the fluid passes through lines 27, 18, and 35 into anion exchange column 11, then through lines 36, 38, 33, and 18 to mixed ion exchange column 13, then through lines 25 and 31 to the drain. The final result is that all the water is clean to less than the detectable level of radioactivity and can be discharged. The reagents and the radioactive contaminants remain on the ion exchange resins and must be disposed of as radioactive waste.

The decontamination solution used in the process of this invention solubilizes metal ions and removes radionuclides by forming a complex with them. The decontamination solution comprises water, about 0.02 to about 0.5% of an organic acid, and about 0.01 to about 0.4% of a chelate. (All percentages herein are by weight and are based on solution weight.) Preferably, the decontamination solution comprises about 0.05 to about 0.3% of the organic acid and about 0.03 to about 0.2% of the chelate, the rest being water. We have found that if less organic acid is used the DF falls off and if more of the organic acid is used the apparatus being cleaned may corrode. Also, it increases the quantity of ion exchange resin waste and may reduce the cation exchangeability. If less chelate is used, a precipitate may form which does not dissolve readily, and if more chelate is used there will be a larger residual metal concentration in the solution due to less ion exchangeability. Both effects decrease the DF. The total decontamination solution should have a pH between about 1.5 and about 4 and preferably between about 2 and about 3. (The organic acid must only be capable of producing a pH of about 2 to about 3, but slightly higher and lower pH's are obtained in the presence of the chelate at higher temperatures.) The temperature of the decontamination solution should be about 70° to about 200° C.

The acid in the decontamination solution must be organic because inorganic acids can leave residual ions which can cause corrosion problems in the reactor. Organic acids, on the other hand, decompose to produce only water and carbon dioxide. The organic acid must have an equilibrium constant for complexing with the ferric ion of at least $10^9$ because the metal ions may precipitate if the equilibrium constant is less than about $10^9$. The organic acid must be capable of giving a pH of about 2 to about 3 in water because a lower pH can cause corrosion and chelate precipitation, and a higher pH reduces the DF. Suitable organic acids include citric acid, tartaric acid, oxalic acid, picolinic acid, and gluconic acid. Citric acid is preferred because it is inexpensive, non-toxic, readily available, and has reasonable radiation stability.

The chelate must have an equilibrium constant for complexing with the ferric ion between about $10^{15}$ and about $10^{19}$. If the equilibrium constant of the chelate is less than $10^{15}$ the metal ions may precipitate and a lower DF obtained. If it is greater than about $10^{19}$ the metal ions may not leave the complex with the chelate and attach to the ion exchange resin. The chelate preferably should be soluble in water having a pH of about 2 to about 3 at at least 0.4%. Also, the chelate must be in the free acid form, not the salt form, because the cation which forms the salt would be removed on the ion exchange column and then the resulting acid form can precipitate, thus plugging the column. Suitable chelates include nitrilotriacetic acid (NTA), and hydroxyethylenediaminetriacetic acid (HEDTA). NTA is preferred as it gives a higher DF, it is more soluble, it leaves less residual iron and nickel in the apparatus being decontaminated, it has the lowest solution activity levels of cobalt 60, and it can chelate more metal per unit of chelate. Ethylenediaminetetracetic acid (EDTA) has not been found to be suitable in the process of this invention, as it is not readily ion exchangeable. This means that metal ions cannot be removed from the EDTA complex efficiently in an ion exchange column. The result is that residual cobalt is left in solution with the EDTA. While this can be removed with anion exchange resins, that results in a loss of the EDTA reagent. Also, EDTA has a lower solubility than NTA, so more dilute solutions and higher temperatures must be used. As a result, the process takes longer and requires higher pressures which increase handling and operational difficulties.

The oxidizing solution converts insoluble $Cr^{+3}$ (in the oxide film) to soluble $Cr^{+6}$ (actually $Cr_2O^=_7$, dichromate). This is necessary because radionuclides are immobilized in the lattice structure of the oxide deposits, and the chromium content renders it insoluble. The oxidizing solution is made up of water, about 0.2 to about 2.5% of an alkali metal permanganate and about 0.2 to about 2.5% of an alkali metal hydroxide. Preferably, it comprises about 0.5 to about 1% of the alkali metal permanganate and about 0.5 to about 1% of the alkali metal hydroxide, the rest being water. If less permanganate is used, the chromium is not readily oxidized and, as a result, the apparatus will not be decontaminated effectively. If more permanganate is used, however, the chromium is also not oxidized and, in addition, precipitates may form. Less or more of the alkali metal hydroxide than is specified will also result in a failure to oxidize, and more hydroxide may also crack the alloys used in the system being cleaned and increase the waste resin volume. We have found that best results occur when the total concentration of permanganate and hydroxide in the oxidizing solution is less than 3% and the amount of permanganate exceeds the amount of hydroxide as that solution minimizes waste and maximizes DF. It may be necessary to refortify the oxidizing solution with permanganate from time to time.

While alkali metal permanganate such as lithium and sodium permanganate can be used, potassium permanganate is preferred because it is inexpensive and readily available and we have found it to have good ion exchange properties. Alkali metal hydroxides such as lithium and potassium, however, have been found not to work as well as sodium hydroxide. Better oxidation and chromium removal seems to result when potassium permanganate is used in combination with sodium hydroxide.

All of the water used in this invention should preferably be deionized water to prevent fouling of the ion exchange resins and leaving residual ions in the system. The water should also be heated to about 70° to about 200° C. to avoid heating and cooling the system.

The decontamination solution must be used in combination with the oxidizing solution as either solution used alone will not result in decontamination.

The following examples further illustrate this invention.

EXAMPLE 1

In these experiments, sections of contaminated tubing from a steam generator of a pressurized water nuclear reactor were used. Each section of tubing was about ¾ inch in diameter and about 1 to 1½ inches long. Each section was cut longitudinally to provide two coupons. The coupons were placed in beakers with various 0.5% decontamination solutions for four hours at 95°–100° C. with agitation. After rinsing in deionized water, the coupons were placed in an oxidizing solution. The oxidizing solution was a 5% solution of sodium hydroxide and potassium permanganate in a 5:1 weight ratio. The coupons were kept in the oxidizing solution for six hours at 95°–100° C. with agitation. After rinsing, the coupons were again placed in a decontamination solution of the same composition under the same conditions. The following table gives the results of testing three pairs of coupons in three different decontamination solutions.

| Decontamination Solution | pH | Cumulative DF After 1st Decon | After Oxidation | After 2nd Decon | Comments |
|---|---|---|---|---|---|
| 30/30/40% mixture of citric/oxalic/NTA | 1.5 (@ 50° C.) | 1.04 | 1.09 | 31.3 | 1. Solution dissolved slowly at about 50° C. |
| 30/30/40% mixture of citric/oxalic/NTA | 1.5 (@ 50° C.) | 1.00 | 1.01 | 25.1 | 2. Greater than 50% clean metal on coupon ID's. |
| 30/30/40% mixture of citric/oxalic/HEDTA | 1.65 (@ 25° C.) | 1.08 | 1.08 | 19.4 | 1. Solution dissolved rapidly at 25° C. |
| 30/30/40% mixture of citric/oxalic/HEDTA | 1.65 (@ 25° C.) | 1.05 | 1.05 | 18.5 | 2. Clean metal plus oxide on coupon ID's. |
| 30/30/40% mixture of citric/oxalic/EDTA | 1.9 (@ 60° C.) | 1.04 | 1.20 | 52.2 | 1. Solution dissolved slowly at about 50° C. |
| 30/30/40% mixture of citric/oxalic/EDTA | 1.9 (@ 60° C.) | 1.07 | 1.07 | 48.4 | 2. Mainly clean metal on coupon ID's and spent solution precipitated on cooling. |

The above table shows that the EDTA based mixture provided for the best DF's, with the NTA mixture close behind. Unfortunately, the EDTA mixture had worse ion exchange parameters. In a 0.5% solution iron could not be removed below about 250 ppm and cobalt could not be removed below about 10 ppm. These problems persisted even at a 0.1% solution concentration, which produced lower DF's than the NTA mixture. The ion exchange characteristics of the HEDTA mixture are similar to those of the EDTA base solutions. Consequently, the NTA/citric/oxalic acid mixture is the preferred decontamination solution because a 0.5% solution can cation exchange iron down to the 50 ppm fluid level and can remove nickel and cobalt down to sub-ppm levels.

EXAMPLE 2

Similar experiments were performed using a 2% oxidizing solution of sodium hydroxide and potassium permanganate in a 1:1 weight ratio. The following table gives the results.

| Decontamination Solution | Total DF |
|---|---|
| 0.5% 30/30/40% citric/oxalic/NTA | 20.4 |
| " | 19.5 |
| 0.5% 30/30/40% oxalic/oxalic/EDTA | 21.9 |
| " | 22.4 |

EXAMPLE 3

Example 2 was repeated using the same conditions and decontamination and oxidizing solutions except that the decontamination solution and the rinse were circulated through ion exchange resins then back to the coupons through metal loops having a 20 gallon total volume. The decontamination solution was circulated through a cation exchange resin which was a strong acid of the all gel type (beads) sold by Dow Chemical Company under the trade designation "DOWEX HCR-W2." The rinses were circulated through a mixed bed ion exchange resin which was a strong acid-strong base. It was made by combining the "DOWEX HCR-W2" with a strong base anion exchange resin of the all gel type sold by Dow Chemical Company under the trade designation "DOWEX SBR" in a 1:1 equivalent ratio. The following table gives the results.

| Type | Temperature | Total DF |
|---|---|---|
| Discontinuous | 85–90° C. | 12.8, 14.9, 15.5, 14.8 |
| Continuous | 95° C. | 80, 65 |

The above table shows that a slightly lower DF was obtained for the first run because it was discontinuous and was operated at a lower temperature. Excellent results were obtained for the second run which was continuous and was operated at a slightly higher temperature. All the removed activity was recovered by the cation resin bed and the solutions were essentially activity free (less than $5.4 \times 10^{-4}$ microcuries per milliliter). The total process time was 24 hours. The projected final resin volume was about 40% of the treated system's volume. (For comparison, a standard decontamination process now in use has an activity of about $80 \times 10^{-4}$ microcuries per mililiter and the final resin volume is about 200–300% of a treated system's volume.)

EXAMPLE 4

The Example 2 was repeated using different concentrations of the NTA solution, the EDTA solution, or a commercial product believed to be 45% EDTA, 25% citric acid, and 30% oxalic acid, with a thiourea inhibitor. The oxidizing solution was 1 or 2% sodium hydroxide-potassium permanganate in a 1:3 or 1:1 ratio. The following table gives the results as an average of treating two coupon halves.

| Decontamination Solution | Oxidizing Solution | DF | Decontamination Solution Characteristic Metal Concentrations After Ion Exchange | |
|---|---|---|---|---|
| | | | Fe | Co |
| 0.5% NTA Solution | 1% 1:3 | 12 | 20 ppm | 1 ppm* |
| 0.7% NTA Solution | 1% 1:3 | 13 | ~30 ppm | ~10 ppm |
| 0.5% NTA Solution | 2% 1:1 | 20 | 20 ppm | 1 ppm* |
| 0.5% Commercial Product | 2% 1:1 | 19 | ~250 ppm | ~30 ppm |
| 0.5% EDTA Solution | 2% 1:1 | 22 | ~200 ppm | ~20 ppm |

*below detection limit

The above table shows that both of the EDTA containing decontamination solutions were unsatisfactory because they did not ion exchange iron or cobalt to low enough levels.

EXAMPLE 5

Example 1 was repeated using a 1% oxidizing solution of various ratios of $KMnO_4$ to NaOH and 0.5% of the commercial decontamination solution described in Example 4. The pairs of coupons were placed in the decontamination solution for 4 hours, followed by 2 hours in the oxidation solution, alternating solutions for four cycles, all at 95° to 100° C. with no mixing. The following table gives the cumulative DF after application of each decontamination solution. (The numbers in parentheses are the results for the second coupon half.)

| Conc. % | NaOH to Permanganate Ratio | % $kMnO_4$ in Oxidant | Cumulative DF | | | |
|---|---|---|---|---|---|---|
| | | | After 1st Decon | 2nd Decon | 3rd Decon | 4th Decon |
| 1.0 | 1:9 | 90 | 1.14 | 4.80 | 17.0 | 36.2 |
| | | | (1.10) | (4.50) | (17.8) | (29.5) |
| 1.0 | 1:3 | 75 | 1.13 | 6.83 | 31.6 | 58.0 |
| | | | (1.08) | (6.91) | (34.6) | (72.0) |
| 1.0 | 1:1 | 50 | 1.11 | 4.66 | 17.1 | 31.9 |
| | | | (1.07) | (4.74) | (19.8) | (35.1) |
| 1.0 | 5:1 | 17 | 1.08 | 4.02 | 15.4 | 27.3 |
| | | | (1.05) | (3.89) | (14.0) | (27.2) |

The above table shows that, when an oxidizing solution containing less than 3% permanganate and hydroxide is used, higher DF's are obtained when the percentage of $KMnO_4$ is over 50 of the oxidant mixture.

We claim:

1. A method of decontaminating metal surfaces coated with oxides containing radioactive substances comprising:
   (A) providing a decontamination solution which comprises
      (1) water;
      (2) about 0.02 to about 0.5% of at least one water-soluble organic acid which has an equilibrium constant in a complex with ferric ion of at least $10^9$, and which is capable of producing a pH of 2 to 3 in water; and
      (3) about 0.01 to about 0.4% of a chelate in free acid form which has an equilibrium constant in a complex with ferric ion of about $10^{15}$ to about $10^{19}$, and which is soluble at at least 0.4% at 40° C. in water having a pH of about 2 to about 3;
   (B) heating said decontamination solution to about 70° to about 200° C.;
   (C) circulating said decontamination solution over said metal surfaces and through a cation exchange resin until the radioactivity of said decontamination solution does not increase significantly after contacting said metal surfaces;
   (D) providing an oxidizing solution which comprises
      (1) water;
      (2) 0.2 to 2.5% of an alkali metal permanganate; and
      (3) about 0.2 to about 2.5% of an alkali metal hydroxide;
   (E) heating said oxidizing solution to about 70° to about 200° C.;
   (F) circulating said oxidizing solution over said metal surfaces until the dichromate level in said oxidizing solution ceases to increase significantly; and
   (G) circulating said decontamination solution over said metal surfaces and through a cation exchange resin until the radioactivity of said decontamination solution does not increase significantly after contacting said metal surfaces.

2. A method according to claim 1 including repeating steps (F) and (G).

3. A method according to claim 1 wherein said organic acid is citric acid.

4. A method according to claim 1 wherein said chelate is nitrilotriacetic acid.

5. A method according to claim 1 wherein said alkali metal permanganate is potassium permanganate and said alkali metal hydroxide is sodium hydroxide.

6. A method according to claim 1 wherein said oxidizing solution is about 0.5 to about 1% alkali metal permanganate and about 0.5 to about 1% alkali metal hydroxide, and said decontamination solution is about 0.05 to about 3% citric acid and about 0.03 to about 0.2% nitrilotriacetic acid.

7. A method according to claim 1 wherein said water is deionized water.

8. A method according to claim 1 including the additional last step of rinsing said metal surfaces with deionized water.

9. A method according to claim 1 wherein said metal surfaces are tubes in a steam generator of a pressurized water nuclear reactor.

10. A method according to claim 9 wherein said decontamination solution is forced up and down said tubes several times before being circulated to said cation exchange resin.

11. A method according to claim 1 including the additional last step of circulating said decontamination solution through an anion exchange resin, and circulating said oxidizing solution through a second mixed anion-cation exchange resin.

12. A method according to claim 11 wherein said cation exchange resin is a strong acid, said anion exchange resin is a weak base, and said mixed anion-cation exchange resins are a mixture of a strong acid with a strong base.

13. A method according to claim 1 including the additional steps between steps (C) and (D), and between steps (F) and (G), of rinsing said metal surfaces with water heated to about 70° to about 200° C. and passing said water over a mixed anion-cation exchange resin.

14. An apparatus for decontaminating metal surfaces having a coating thereon which contains a radioactive substance comprising:

(A) a decontamination tank for holding a decontamination solution;

(B) means for circulating said decontamination solution between said decontamination tank and said metal surfaces;

(C) a cation exchange column containing a cation exchange resin;

(D) means for circulating said decontamination solution between said decontamination tank and said cation exchange column;

(E) an oxidizing tank for holding an oxidizing solution;

(F) means for circulating said oxidizing solution between said oxidizing tank and said metal surfaces;

(G) a water tank for holding water;

(H) means for circulating water between said water tank and said metal surfaces;

(I) a mixed anion-cation exchange column containing a mixed anion-cation exchange resin; and (J) means for circulating said water between said water tank and said mixed anion-cation exchange column.

15. Apparatus according to claim 14 including:

(A) an anion exchange column containing an anion exchange resin; and (B) means for circulating said decontamination solution from said decontamination tank through said oxidizing tank and said anion exchange column.

16. Apparatus according to claim 14 including:

(A) a second mixed anion-cation exchange column containing a second mixed anion-cation exchange resin; and (B) means for circulating said oxidizing solution from said oxidizing tank to said second mixed anion-cation exchange column.

17. Apparatus according to claim 14 wherein said cation exchange resin is a strong acid, said anion exchange resin is a weak base, and said mixed anion-cation exchange resin is a strong acid with a strong base.

* * * * *